July 22, 1952
J. DAUGHERTY
2,604,363
MACHINE TOOL
Filed July 17, 1947
3 Sheets-Sheet 1
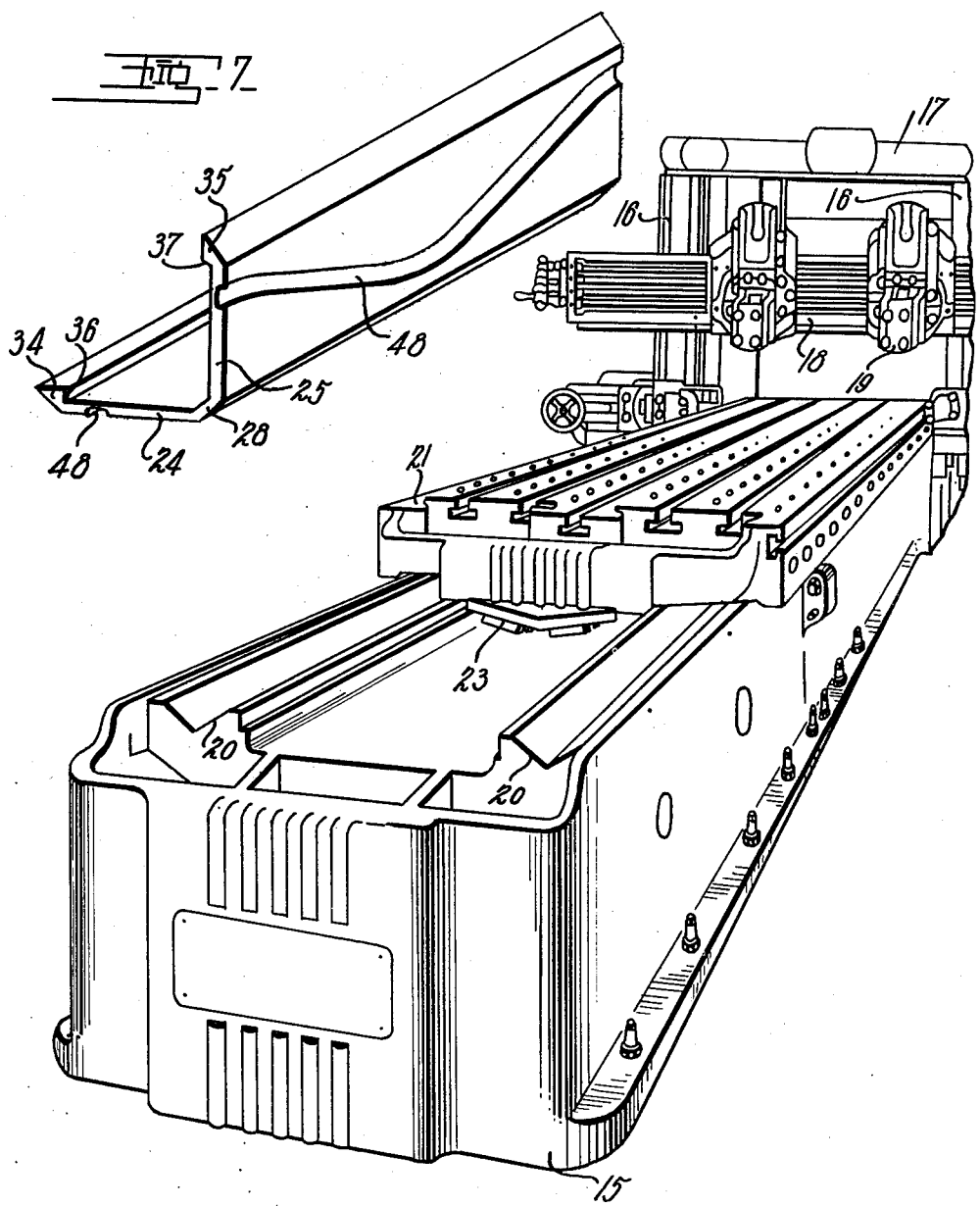
INVENTOR.
JESSE DAUGHERTY
BY
Joseph A. Rane
Atty.

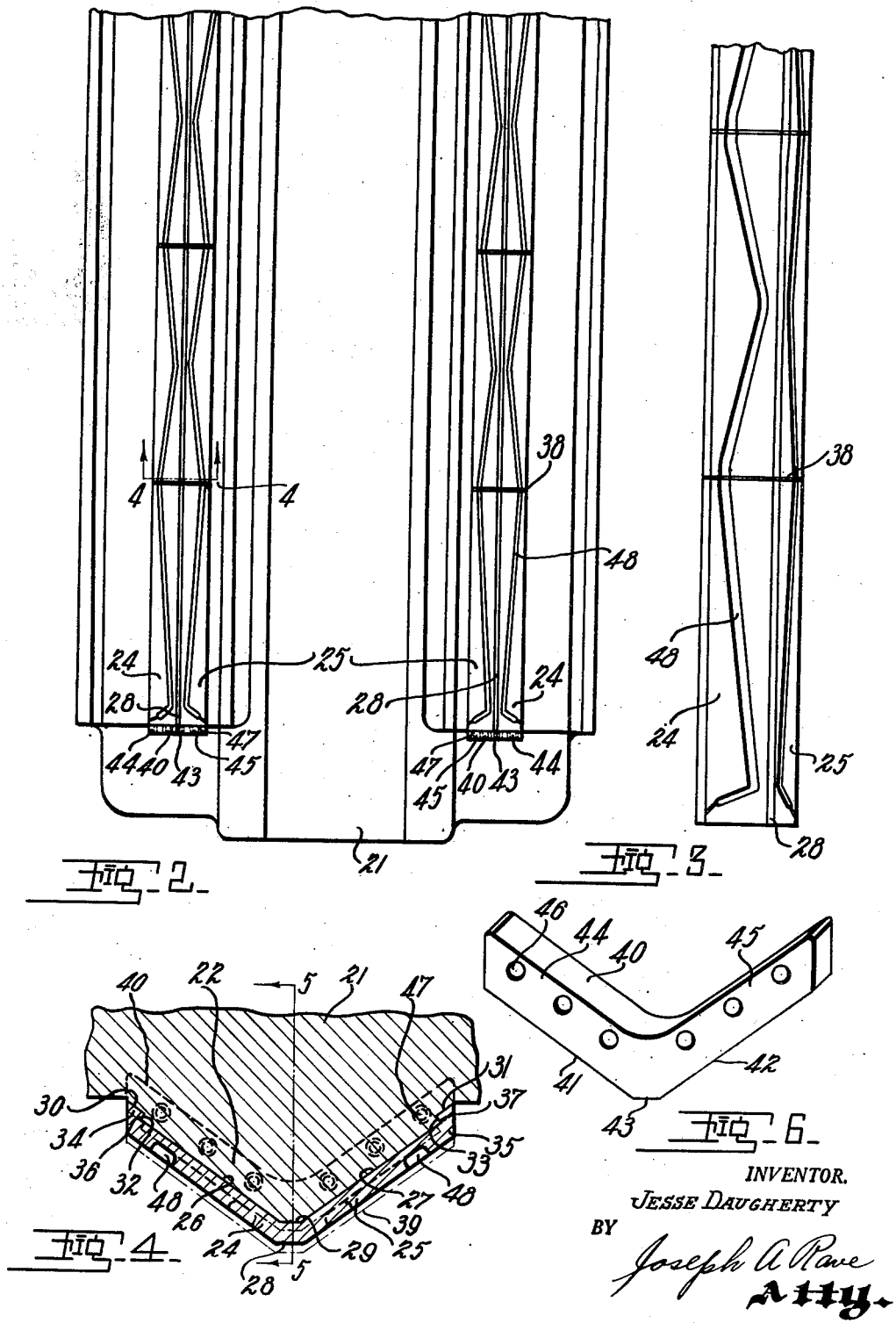

July 22, 1952
J. DAUGHERTY
2,604,363
MACHINE TOOL
Filed July 17, 1947
3 Sheets-Sheet 3
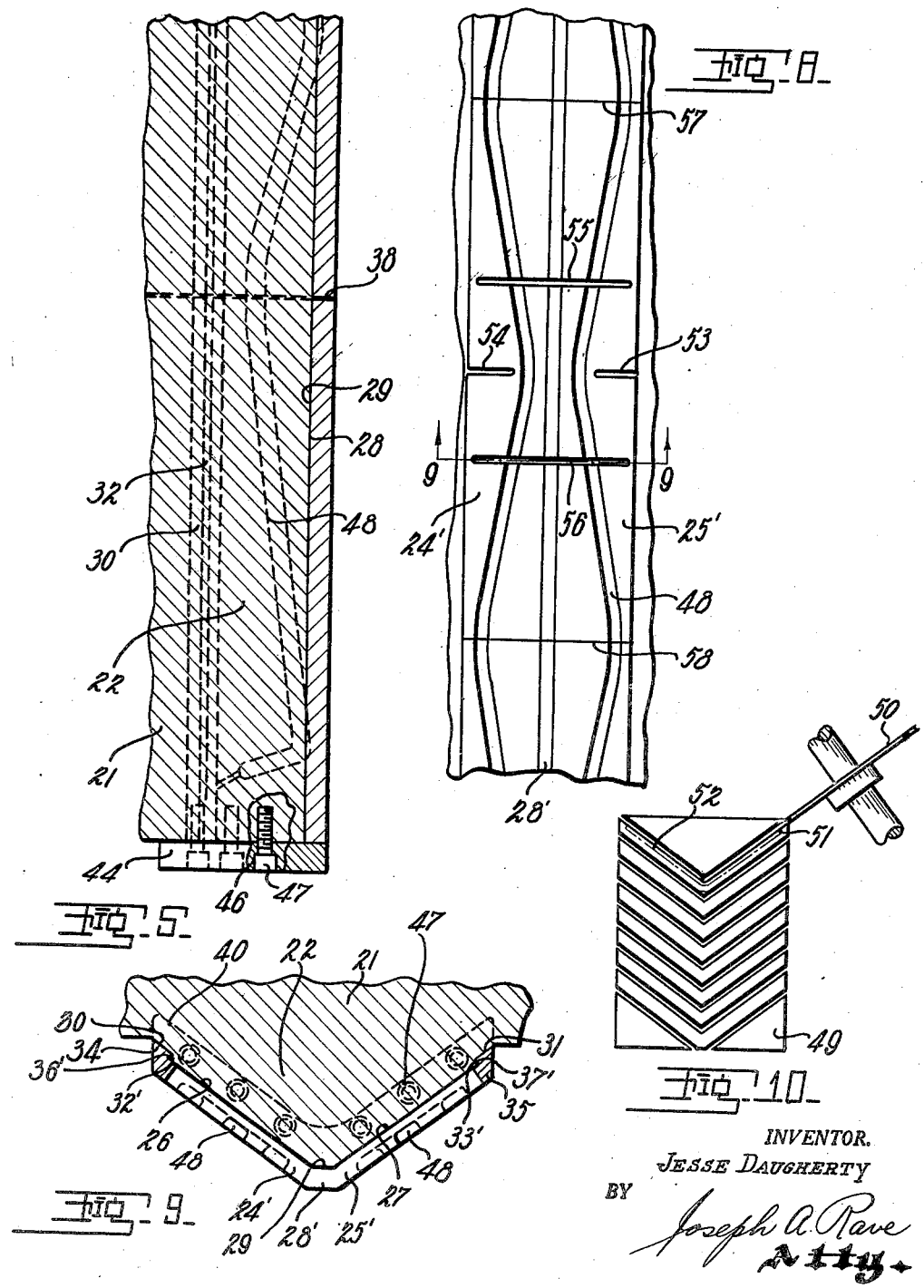
INVENTOR.
JESSE DAUGHERTY
BY
Joseph A. Rave
Atty.

Patented July 22, 1952

2,604,363

UNITED STATES PATENT OFFICE 2,604,363

MACHINE TOOL

Jesse Daugherty, Cincinnati, Ohio, assignor, by mesne assignments, to Giddings & Lewis Machine Tool Company, Fond du Lac, Wis., a corporation of Wisconsin Application July 17, 1947, Serial No. 761,571

16 Claims. (Cl. 308—3)

This invention relates to improvements in machine tools and particularly to improvements in guide and bearing means for reciprocating tables or other work supporting or tool supporting reciprocating members.

The invention will be described in connection with a metal planer but it is to be understood that the invention is not limited to a metal planer table but, as noted above, has equal application to any supporting reciprocating member.

This invention is an improvement on the disclosure in applicant's pending application Serial No. 708,417 filed November 7, 1946, for Machine Tools.

As is well known, modern tendency in machine tools is for higher speeds which in the case of a metal planer requires the table to travel at the rate of 300 feet and more per minute. This speed results in the generation of friction heat, between the table guides and bed guide ways causing the table to bow as the said heat flows into the bottom plate of table from the contacting surface of its guides. Another difficulty encountered is the flash welding to the table guides of impurities, chips and the like, which may collect on the bed guide ways and are picked up by the table guides during their movement, resulting in scoring of the bed guide ways.

It has been found that by applying an extraneous bearing surface to the table guides, particularly a non-metallic bearing surface, the rate of heat transfer to the table has been materially retarded and preventing or at least materially minimizing, the bowing of the table, and since such a surface is relatively soft it has the faculty of carrying the impurities on the bed guide way along with it without scratching or cutting the said bed guide way thereby preventing damage.

In the past, and as illustrated in the above identified pending application, the said table guide bearing surface was formed as individual blocks or pieces for each side of the usual V guide and required bolts or pins to pass through the said individual blocks or pieces, or required a mounting strip to secure at least one edge of said blocks or pieces to each side of the V guide which, as will be readily understood, is a time consuming operation. By the present invention the production operations and labor entailed in the mounting of the extraneous guide bearing surface are materially reduced.

It is therefore, the principal object of the present invention to provide a sliding bearing or surface for the V guides of a reciprocating member that can be readily and expeditiously applied.

Another object of the present invention is the provision of a guiding bearing or surface for a reciprocating member V-shaped guide that can be applied to both guiding faces simultaneously.

A still further object of the present invention is the provision of a guiding bearing or surface for a V guide that conforms accurately to the cross section of the said V guide and has integral therewith mounting means for readily securing the said guiding bearing or surface in position.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a perspective view of a metal planer having incorporated therein the improvements of the present invention.

Fig. 2 is a bottom plan view of a portion of a work supporting table having secured thereto the guiding bearing or surfaces of the present invention.

Fig. 3 is an enlarged elevational view of a plurality of guiding bearings or surfaces of the present invention showing same in operative relation to one another.

Fig. 4 is an enlarged fragmentary sectional view through a V guide having mounted thereon the guide bearing or surface of the present invention as seen from line 4—4 on Fig. 2.

Fig. 5 is an enlarged fragmentary longitudinal sectional view through one end of a V guide as seen from line 5—5 on Fig. 4.

Fig. 6 is a perspective view of the guide end plate to prevent disassociation of the supporting bearings or surfaces from the table guide.

Fig. 7 is a perspective view of one of the guide bearings or surfaces forming the subject matter of the present invention.

Fig. 8 is a plan view of a portion of a V guide having mounted thereon a guide bearing or surface of the present invention disclosing a modification in the construction thereof.

Fig. 9 is a transverse sectional view through the table guide and its guide bearings or surface as seen from line 9—9 on Fig. 8.

Fig. 10 illustrates a method of making or forming the improved guide bearing surface of the present invention.

Throughout the several views of the drawings similar reference characters are employed to denote the same or similar parts.

The metal planer illustrated in Fig. 1 comprises a supporting bed 15 having rising there above substantially midway of its length uprights 16 joined by a top 17. Mounted on the uprights 16 is the rail 18 that supports heads 19 for tools that operate on work being machined. The bed 15 has integral therewith on its upper surface guide ways 20 which are V-shaped in cross section.

Mounted on the bed 15 is the work supporting table 21 having projecting from its under surface V-shaped guides 22, see Fig. 4, adapted to be received in the guide ways 20. The table 21 is reciprocated or moved by a rack 23 secured to the underside of the table 21 and projecting downwardly therefrom substantially midway of the guides 22. The rack 23 is enmeshed with a driving gear (not shown) located within the bed 15 and driven from any suitable or desirable source (not shown).

The bed guide ways 20 and the table guides 22 are formed of metal and in the past had surface contact with one another wherefor a metal to metal sliding bearing resulted with which no appreciable difficulty was encountered until the present day high speed requirements occurred. In order to reduce friction between the bed guide ways and table guides lubricant under pressure was supplied between the said guide ways and guides but the friction heat and scoring difficulty has persisted and as the speed of the table travel increased the said difficulty likewise increased. To further overcome this difficulty use was made of non-metallic bearings or surface secured to the table guides. It has been found that a material that can be used for this purpose is a laminated condensation product since it has good heat insulating properties and at the same time has sufficient yield or elasticity to allow grit and the like to imbed itself and prevent same from projecting therefrom for scoring or otherwise damaging the bed guide ways.

As was noted above in the past the non-metallic bearings or surfaces were made in the form of a plurality of blocks for each surface of the V and which blocks were retained by screws or by pins passing therethrough or by retaining strips integral with or secured to these faces. By the present invention non-metallic bearings or surfaces for each face of a V guide are integral with one another thereby producing a more uniform product and materially reducing the time and expense incident to applying the said bearing faces to the V guide.

As shown in Fig. 7 the improved non-metallic bearing comprises a wing or face 24 at an angle to a second wing or face 25 with said faces having an included angle equal to the angle of divergence of the table V guide faces 26 and 27. The said bearings' wings are joined at their inner ends by a flat portion 28 which underlies the flat portion 29 between the table guide faces 26 and 27.

In order to mount the composite bearings on the table guide the table guide faces 26 and 27, are each at its outer end, undercut as at 30 and 31 thereby providing shoulders 32 and 33 between the said V faces 26 and 27 and their respective undercuts 30 and 31. Cooperating with the said shoulders 32 and 33 each of the bearing wings or faces 24 and 25 is provided at its outer end with a thickened longitudinal flange 34 and 35 thereby providing a lip 36 and 37 inwardly of the said flanges 34 and 35.

As shown in Fig. 4 the guide shoulders 32 and 33 are formed normal or at right angles to the V faces 26 and 27 which in effect provide the shoulders 32 and 33 with inwardly projecting faces so that when the lips 36 and 37 of the bearing engages therewith there is provided, in effect, an undercut lock prohibiting removal of the said bearing except upon springing of the bearing sides 24 and 25 outwardly of the bearing guide face 26 and 27 or longitudinally sliding the bearing along the guide.

Certain of the laminated condensate materials from which the bearing may be made has a co-efficient of thermal expansion greater than the co-efficient of thermal expansion of the metal of the guide and furthermore this material has a tendency to "grow," that is, elongate when the fibres of the laminated material become saturated as with lubricating oil. To take care of this expansion or other elongation the bearing is made in comparatively short sections and a plurality of them are mounted on the table guide with a space 38 between adjacent bearing sections.

The individual bearing section may be mounted on the table guide by sliding same onto the shoulders 32 and 33 from one or the other end of the said table guide or they may slide on from both ends thereof toward the center of the table with the space 38 left between adjacent bearing sections. The said bearing has, however, sufficient spring in its sides 24 and 25 that instead of being slid from one or both ends of the table guide they may be snapped thereon at which time the bearing section should be arranged in the position shown in phantom lines at 39 in Fig. 4 and by applying pressure to the flat 28 of the bearing section cause the sides thereof to bow until the lips 36 and 37 snap onto the shoulders 32 and 33. This is permissable due to the fact that a small clearance is provided between the lips 36 and 37 and the shoulders 32 and 33. The amount of clearance being comparatively small and of a nature to insure sufficient looseness in the bearing so that it may move longitudinally or axially of itself to take care of thermal expansion, if necessary, and saturation growth, again, if necessary.

It will be noted that the bearing sections are loosely mounted on the table guides and upon reversal of the table or other reciprocating member may be moved from their normal position toward the end of the table trailing in the movement. In order to prevent the complete removal of the bearing members from the table guide use is made of end plates 40. The end plates 40 are substantially identical and each is V-shaped in elevation and has an outer peripheral surface 41 and 42 which coincides with the outer surface of the bearing sides 24 and 25 with said retaining plates having a joining flat portion 43 corresponding to the flat 28 between the bearings sides 24 and 25. Each of the retaining plates 40 is provided through its arms 44 and 45 with a plurality of counter sunk apertures 46 through each of which passes a screw 47, see Fig. 5. The screws 47 are threaded into the ends of the table guide 22.

From the foregoing it should be noted that there has been provided a non-metallic bearing for supplying a non-metallic bearing face simultaneous to each face of a V guide. In order to properly lubricate the supporting face, each of the bearing sides 24 and 25 is provided with the usual oil groove 48. As seen in Fig. 3 the oil groove 48 in each bearing member joins with the oil groove in its succeeding bearing member wherefore a continuous oil groove is provided throughout the bearing even though the said bearing faces are formed of comparatively short sections.

The bearing members may be molded to the shape and size desired, such as illustrated in Fig. 7, or the said bearing members may be formed from a block of laminated condensate product. In order to accomplish the formation of the bearing members by the latter process a block of laminated condensate material 49, Fig. 10, is employed, the block having a width equal to the maximum transverse width of the bearing. By the use of a rotating saw 50 set to cut at the desired angle to a vertical line centrally of the bearing member the V-shaped bearing sections 51 may be produced. The inner face of each side 24 and 25 may be then milled or planed as shown in phantom lines at 52 in Fig. 10, to provide the lips 36 and 37 for each bearing member. As seen in Fig. 10 a block of material of sufficient height is utilized to obtain a plurality of bearings from the block, the said bearings being obtained by making successive saw cuts longitudinally of the block with each saw cut at the proper angle and parallel with the previous saw cut.

Instead of the bearing sections being mounted to have the space 38 between them for expansion purposes the bearings may be formed, as illustrated in Figs. 8 and 9, with each bearings member being provided with means for its own expansion. The said expansion means comprising relieved portions or cuts 53 and 54 substantially centrally of the bearing sections length and from the outer edges of each of the bearing sides 24' and 25' together with saw cuts or relieved portions 55 and 56 located, respectively, on either side of the relieved portions or saw cuts 53 and 54 and with said relieved portions or saw cuts 55 and 56 extending across the apex of the bearing but not extending through the outer edges thereof. The bearing section if made in accordance with the disclosure in Fig. 8 should have their opposite ends abutting the adjacent ends of adjacent bearing sections as at 57 and 58.

With this construction any expansion between the ends 57 and 58 of the bearing section would be taken up by a closing in on the relieved portions or saw cuts 53 to 56, inclusive. It should be noted that the said relieved portions or saw cuts 53 to 56, inclusive do not cut through or extend the oil grooves to the outer edges of the bearings wherefor the oil pressure in said grooves is not lost or relieved.

A further modification illustrated in Fig. 9 consists in forming the shoulders 32' and 33' of the V guide as inwardly disposed instead of just normal or at right angles to the faces 26 and 27 of the guide. Accordingly the lips 36' and 37' of the modified bearing, correspondingly incline inwardly to provide the necessary engaging angles between these parts. It will be understood that the shoulders 32 and 33 and the lips 36 and 37 of Fig. 4 may be inclined as illustrated in Fig. 9 instead of being normal.

From the foregoing it will be now evident that there has been provided an improved reciprocating member guide and bearing to accomplish the objects initially set forth.

What is claimed is:

1. In a machine tool the combination of a supporting bed having a V guide way, a reciprocating member having a V guide, said bed V guide way and reciprocating member V guide having their respective faces diverging at substantially equal angles, a V-shaped bearing member comprising wings diverging from one another and having an included angle substantially equal to the angle of divergence of the faces of the bed guide way and reciprocating member guide with each wing having a bearing face and the bearing member having its wings located between the reciprocating member V guide faces and the opposed bed V guide way faces with the bearing faces of the wings contacting the bed V guide way faces, and means for mounting the bearing member on the reciprocating member V guide for movement therewith.

2. In a machine tool the combination of a supporting bed having a V guide way, a reciprocating member having a V guide, said bed V guide way and reciprocating member V guide having their respective faces diverging at substantially equal angles, a V-shaped bearing member comprising wings diverging from one another and having an included angle substantially equal to the angle of divergence of the faces of the bed guide way and reciprocating member guide with each wing having a bearing face and the bearing member having its wings located between the reciprocating member V guide faces and the opposed bed V guide way faces with the bearing faces of the wings contacting the bed V guide way faces, and means for mounting the bearing member on the reciprocating member V guide for movement therewith and limited independent bodily movement longitudinally and transversely relative thereto.

3. In a machine tool the combination of a supporting bed having a V guide way, a reciprocating member having a V guide, said bed V guide way and reciprocating member V guide having their respective faces opposed to one another and diverging at substantially equal angles, a plurality of V-shaped bearing members each comprising wings diverging from one another and having an included angle substantially equal to the angle of divergence of the faces of the bed guide way and reciprocating member guide with each wing having a bearing face and the bearing members having their wings located between the opposed faces of the reciprocating member V guide and bed V guide ways with the wings bearing faces adjacent one another in alignment, and means for mounting said bearing members on the reciprocating member V guide for movement therewith.

4. In a machine tool the combination of a supporting bed having a V guide way, a reciprocating member having a V guide, said bed V guide way and reciprocating member V guide having their respective faces opposed to one another and diverging at substantially equal angles, a plurality of V-shaped bearing members each comprising wings diverging from one another and having an included angle substantially equal to the angle of divergence of the faces of the bed guide way and reciprocating member guide with each wing having a bearing face and the bearing members having their wings located between the opposed faces of the reciprocating member V guides and bed V guide ways with the wings bearing faces adjacent one another in alignment, and means for mounting said bearing members on the reciprocating member V guide for movement longitudinally and transversely therewith and independent bodily movement relative thereto.

5. In a machine tool the combination of a supporting bed having a V guide way, a reciprocating member having a V guide, said bed V guide way and reciprocating member V guide having their respective faces opposed to one another and diverging at substantially equal angles, a plurality of bearing members each comprising bearing faces or wings diverging from one another and having an included angle substantially equal to the angle of divergence of the faces of the bed guide way and reciprocating member guide and having their bearing faces or wings in alignment with one another between the opposed faces of the reciprocating member V guide and bed V guide ways, and means for mounting said bearing members on the reciprocating member V guide for movement therewith, comprising a shoulder on the V guide at the upper ends of its faces, and a cooperating engaging lip at the upper ends of the bearing faces or wings of said bearing members.

6. In a machine tool the combination of a supporting bed having a V guide way, a reciprocating member having a V guide, said bed V guide way and reciprocating member V guide having their respective faces opposed to one another and diverging at substantially equal angles, a plurality of bearing members each comprising bearing faces or wings diverging from one another and having an included angle substantially equal to the angle of divergence of the faces of the bed guide way and reciprocating member guide and having their bearing faces or wings in alignment with one another between the opposed faces of the reciprocating member V guide and table V guide ways, and means for mounting said bearing members on the reciprocating member V guide for movement therewith, comprising a shoulder on the V guide at the upper ends of its faces, a cooperating engaging lip at the upper ends of the bearing faces or wings of the bearing members, and retaining plates at the ends of the V guide for preventing disassociation of the bearing members and reciprocating member V guide.

7. In a machine tool the combination of a supporting bed having a V guide way, a reciprocating member having a V guide, said bed V guide way and reciprocating member V guide having their respective faces opposed to one another and diverging at substantially equal angles, a plurality of non-metallic V-shaped bearing members each comprising a wing diverging from one another and having an included angle substantially equal to the angle of divergence of the bed guide way and reciprocating member guide with each wing having an exterior bearing face and said bearing members extending longitudinally of the reciprocating member guide between the opposed faces of the bed guide way and reciprocating member guide with their bearing faces in contact with the bed guide way, and means for mounting said bearing members on the reciprocating member guide with a space between adjacent ends of the bearing members whereby the said bearing members are moved with the reciprocating member and they have independent bodily movement longitudinally and transversely relative thereto.

8. In a machine tool the combination of a supporting bed having a V guide way, a reciprocating member having a V guide, said bed V guide way and reciprocating member V guide having their respective faces opposed to one another and diverging at substantially equal angles, a plurality of non-metallic bearing members each comprising bearing faces or wings diverging from one another and having an included angle substantially equal to the angle of divergence of the faces of the bed guide way and reciprocating member guide and having their bearing faces or wings in alignment with one another between the opposed faces of the reciprocating member V guide and table V guide ways, and means for mounting said bearing members on the reciprocating member V guide for movement therewith and independent bodily movement relative thereto, comprising interengaging shoulders and lips on the reciprocating member and bearing members and relieved portions in each bearing member intermediate the ends thereof.

9. As an article of manufacture a V-shaped bearing member for a V guide of a reciprocating member comprising bearing faces or wings diverging from one another and having an included angle substantially equal to the angle of divergence of the sides of the V guide, and means integral with said bearing member at the free ends of the bearing faces or wings for mounting the same on the V guide.

10. As an article of manufacture a V-shaped bearing member for a V guide of a reciprocating member comprising bearing faces or wings diverging from one another and having an included angle substantially equal to the angle of divergence of the sides of the V guide, and means at the outer longitudinal edge margins of the said bearing faces or wings for mounting the bearing member on the V guide.

11. As an article of manufacture a bearing member for a V guide of a reciprocating member comprising bearing faces or wings diverging from one another and having an included angle substantially equal to the angle of divergence of the sides of the V guide, and means at the outer ends of said bearing faces or wings for mounting the bearing member on the V guide, comprising lips inwardly projecting from each bearing face or wing.

12. As an article of manufacture a bearing member for a V guide of a reciprocating member comprising bearing faces or wings diverging from one another and having an included angle substantially equal to the angle of divergence of the sides of the V guide, means at the outer ends of said bearing faces or wings for mounting the bearing member on the V guide, said bearing member being formed of non-metallic material capable of dimensional changes due to thermal expansion and absorption, and means within the bearing member for permitting the said dimensional change.

13. As an article of manufacture a bearing member for a V guide of a reciprocating member comprising bearing faces or wings diverging from one another and having an included angle substantially equal to the angle of divergence of the sides of the V guide, means at the outer ends of said bearing faces or wings for mounting the bearing member on the guide, said bearing member being formed of non-metallic material capable of dimensional changes due to thermal expansion and absorption, and means within the bearing member for permitting the said dimensional change, comprising relieved portions transversely of the bearing member and its wings.

14. As an article of manufacture a bearing member for a V guide of a reciprocating member comprising bearing faces or wings diverging from one another and having an included angle substantially equal to the angle of divergence of the sides of the V guide, means at the outer ends of said bearing faces or wings for mounting the bearing member on the V guide, comprising lips inwardly projecting from each bearing face or wing, said bearing member being formed of non-metallic material capable of dimensional changes due to thermal expansion and absorption, and means within the bearing member for permitting the said dimensional change, comprising relieved portions transversely of the bearing member and its wings.

15. As an article of manufacture a V-shaped bearing member comprising wings diverging from one another, each wing having length and breadth and including an outer bearing face and an inner face which are substantially parallel with one another throughout the length and breadth of its wing, and mounting means carried by each wing for removably mounting the bearing member in position.

16. As an article of manufacture a V-shaped bearing member comprising wings diverging from one another, each wing having length and breadth and including an outer bearing face and an inner face which are substantially parallel with one another throughout the length and breadth of its wing, and means integral with the free marginal edge of each wing for removably mounting the bearing member in position.

JESSE DAUGHERTY.

REFERENCES CITED

The following references are of record in the file of this patent:

UNITED STATES PATENTS

| Number | Name | Date |
|---|---|---|
| 1,685,434 | Parkes | Sept. 25, 1928 |
| 1,901,522 | Meier | Mar. 13, 1933 |
| 2,170,545 | Burton | Aug. 22, 1939 |
| 2,237,287 | Bigelow | Apr. 8, 1941 |
| 2,378,343 | Walter | June 12, 1945 |
| 2,433,587 | Wentworth | Dec. 30, 1947 |